United States Patent
Shao et al.

(10) Patent No.: US 9,110,650 B2
(45) Date of Patent: Aug. 18, 2015

(54) ELECTRONIC DEVICE HAVING USB INTERFACE AND METHOD FOR STARTING USB COMMUNICATION WITH SUCH DEVICE

(75) Inventors: Yongping Shao, Shenzhen (CN); Huiqin Shi, Shenzhen (CN); Min Xu, Shenzhen (CN); Tao Wang, Shenzhen (CN); Tierui Yao, Shenzhen (CN); Xiaofeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 69 days.

(21) Appl. No.: 14/113,947

(22) PCT Filed: Nov. 15, 2011

(86) PCT No.: PCT/CN2011/082207
§ 371 (c)(1),
(2), (4) Date: Oct. 25, 2013

(87) PCT Pub. No.: WO2012/146024
PCT Pub. Date: Nov. 1, 2012

(65) Prior Publication Data
US 2014/0059363 A1     Feb. 27, 2014

(30) Foreign Application Priority Data
Apr. 29, 2011   (CN) .......................... 2011 1 0110832

(51) Int. Cl.
*G06F 1/26*      (2006.01)
*H02J 7/00*      (2006.01)
(Continued)

(52) U.S. Cl.
CPC ................ *G06F 1/26* (2013.01); *G06F 13/385* (2013.01); *G06F 13/4295* (2013.01); *H02J 7/00* (2013.01); *H02J 2007/0062* (2013.01)

(58) Field of Classification Search
None
See application file for complete search history.

(56) References Cited

U.S. PATENT DOCUMENTS

2007/0108938 A1   5/2007  Veselic
2010/0052620 A1   3/2010  Wong
(Continued)

FOREIGN PATENT DOCUMENTS

CN    101179199 A    5/2008
CN    101383627 A    3/2009
(Continued)

OTHER PUBLICATIONS

International Search Report in international application No. PCT/CN2011/082207, mailed on Dec. 29, 2011. (3 pages—see entire document).

(Continued)

*Primary Examiner* — Kim Huynh
*Assistant Examiner* — Vincent Chang
(74) *Attorney, Agent, or Firm* — Oppedahl Patent Law Firm LLC

(57) ABSTRACT

The present disclosure provides an electronic device having a USB interface and a method for starting USB communication with such an electronic device, so as to solve the problem of a risk of damaging a mobile phone terminal device arising from sharing of an interface by a charger and a USB communication cable in the related art. In the electronic device, a port GPIO of a baseband chip is connected to a pin USB_VBUS of a USB interface of the baseband chip; based on this circuit, a power management chip detects a state of plugging-in-or-pulling-out of the charger and generates a corresponding interrupt request; and the baseband chip controls the GPIO to output a corresponding level according to the interrupt request. By connecting the port GPIO and the pin USB_VBUS and controlling an output level of GPIO with a software, a high level or a low level (as a triggering signal for starting or terminating the USB communication) is input to the pin USB_VBUS, thus avoiding damage to the device.

10 Claims, 2 Drawing Sheets

(51) Int. Cl.
*G06F 13/38* (2006.01)
*G06F 13/42* (2006.01)

(56) References Cited

U.S. PATENT DOCUMENTS

| | | | |
|---|---|---|---|
| 2010/0060233 A1* | 3/2010 | Kung et al. | 320/107 |
| 2010/0090644 A1* | 4/2010 | Nokkonen et al. | 320/107 |
| 2010/0146309 A1* | 6/2010 | Ohie et al. | 713/300 |
| 2010/0162011 A1 | 6/2010 | Min | |
| 2010/0293302 A1* | 11/2010 | Fujii et al. | 710/16 |
| 2011/0043162 A1 | 2/2011 | Lee | |
| 2011/0314201 A1* | 12/2011 | Su et al. | 710/316 |
| 2012/0139478 A1* | 6/2012 | Wu | 320/107 |
| 2013/0002195 A1 | 1/2013 | Lee et al. | |
| 2013/0002196 A1 | 1/2013 | Lee et al. | |

FOREIGN PATENT DOCUMENTS

| | | |
|---|---|---|
| CN | 101567556 A | 10/2009 |
| CN | 101674366 A | 3/2010 |
| CN | 201430603 Y | 3/2010 |
| CN | 101901201 A | 12/2010 |
| CN | 102202117 A | 9/2011 |
| CN | 102223439 A | 10/2011 |

OTHER PUBLICATIONS

English Translation of the Written Opinion of the International Search Authority in international application No. PCT/CN2011/082207, mailed on Dec. 29, 2011. (11 pages—see entire document).
Supplementary European Search Report in European application No. 11864305.5, mailed on Nov. 20, 2014.

* cited by examiner

ELECTRONIC DEVICE HAVING USB INTERFACE AND METHOD FOR STARTING USB COMMUNICATION WITH SUCH DEVICE

TECHNICAL FIELD

The present disclosure relates to the field of USB technology, and in particular to an electronic device having a USB interface and a method for starting USB communication with such an electronic device.

BACKGROUND

In an electronic device having a USB interface such as a handheld terminal having a USB interface in the related art, one cable is shared as both a USB communication cable and a charging cable, that is, the cable can serve for both charging and USB communication. Thus the positive terminal VCHG of a charging interface of a mobile phone is short-circuited with a pin USB_VBUS directly or indirectly.

A USB interface circuit of a handheld terminal device includes two pins. One is a charging voltage pin VCHG on a power management chip, pin VCHG being configured to detect a state of plugging-in-or-pulling-out of a charger; it is determined that the charger is plugged in when the voltage at pin VCHG is greater than a certain threshold (e.g. 3.3V), and it is determined that the charger is pulled out when the voltage at pin VCHG is less than or equal to a certain threshold (e.g. 3.3V). The other pin is a USB-bus-power-supply positive terminal pin USB_VBUS of a USB interface chip; it is determined that plugging-in of a USB communication cable starts a USB state machine when the voltage at pin USB_VBUS is greater than a session value in a USB standard (e.g. 2.0V, which is a starting voltage of the USB state machine); and it is determined that a USB communication cable is pulled out when the voltage at pin USB_VBUS is no less than 0V and no more than the session value in the USB standard (e.g. 2.0V).

A condition for starting a charging state machine of a handheld terminal having a USB interface is as follows. It is determined, by detection, whether the positive terminal of the charging interface is greater than a certain threshold (e.g. 3.3V); if an input voltage is greater than the threshold, it is determined that the charger is plugged in, and charging management is started; and if it is not greater than the threshold, it is determined that the charger is pulled out, and charging has stopped. In addition, pin VCHG has a relatively wide range of operating voltages, which is normally between 10V and 20V (e.g. 18V), while pin USB_VBUS has a range of low operating voltages, the maximum operating voltage of USB_VBUS being 5.25V, normally.

In general, a condition for starting a USB state machine of a handheld terminal is as follows. It is determined whether the voltage at pin USB_VBUS (positive terminal of a USB bus power supply) is greater than the session value (e.g. 2.0V) in the USB standard; if an input voltage is greater than the session value, a USB enumeration process is started; and if it is no greater than the session value, the USB state machine is shut down. The maximum operating voltage of USB_VBUS is normally 5.25V which is relatively low. A problem thus brought forth is that the condition for starting the USB state machine is different from that for starting the charging state machine, which requires adoption of a circuit for distinguishing different signals so as to implement the start of USB communication. A usual practice in related art in a solution for starting USB communication with an interface shared by a charger and a USB communication cable is, as shown in FIG. 1, to lower the voltage at VCHG by a voltage-regulator diode before connecting VCHG to USB_VBUS. Such a method requires a relatively simple circuit, but fails to protect the device from the overshoot at the instant of plugging-in of the charger due to a low response speed of the voltage-regulator diode.

It is thus clear that sharing of an interface by a charger and a USB communication cable in the related art can easily cause damage to a mobile phone terminal device.

SUMMARY

In view of this, the purpose of the present disclosure is to provide an electronic device having a USB interface and a method for starting USB communication with such a device directed at the problem of a risk of damaging a mobile phone terminal device arising from sharing of an interface by a charger and a USB communication cable in the related art. The electronic device having a USB interface includes a power management chip and a baseband chip, wherein a communication interface of the baseband chip is connected to a communication interface of the power management chip, the power management chip comprises a charging voltage pin VCHG configured for connection to a positive terminal of a charger, and a General Purpose Input/Output port GPIO of the baseband chip is connected to a USB-bus-power-supply positive terminal pin USB_VBUS of a USB interface of the baseband chip.

In the electronic device having a USB interface, the communication interface of the baseband chip may be a Serial Bus Interface, a Single-wire Serial Bus Interface, an Inter Integrated Circuit Bus, or a Serial Peripheral Interface.

In the electronic device having a USB interface, the communication interface of the power management chip may be a Serial Bus Interface, a Single-wire Serial Bus Interface, an Inter Integrated Circuit Bus, or a Serial Peripheral Interface.

In the electronic device having a USB interface, the communication interface of the baseband chip may be connected to the communication interface of the power management chip through an interface bus.

In the electronic device having a USB interface, the electronic device having a USB interface may be a handheld terminal having a USB interface.

An embodiment of the present disclosure further provides a method for starting USB communication with the aforementioned electronic device having a USB interface, the method including:

detecting, by a power management chip, a state of plugging-in-or-pulling-out of a charger and generating, by the power management chip, a corresponding interrupt request; and controlling, by a baseband chip, a General Purpose Input/Output port GPIO to output a corresponding level according to the interrupt request.

In the method, the detecting, by a power management chip, a state of plugging-in-or-pulling-out of a charger and generating, by the power management chip, a corresponding interrupt request may be: generating, by the power management chip, a first interrupt request when the power management chip detects plugging-in of the charger; and the controlling, by a baseband chip, a General Purpose Input/Output port GPIO to output a corresponding level according to the interrupt request may be: controlling, by the baseband chip, the GPIO to output a high level to a USB-bus-power-supply positive terminal pin USB_VBUS according to the first interrupt request, wherein the high level is greater than a starting voltage of a USB state machine and less than a maximum operating voltage of the pin USB_VBUS.

In the method, the controlling, by the baseband chip, start of USB communication may be:

when detecting, by the baseband chip, that the level input to the pin USB_VBUS is greater than the starting voltage of the USB state machine, starting, by the baseband chip, the USB state machine, and starting, by the USB state machine, the USB communication.

In the method, the detecting, by a power management chip, a state of plugging-in-or-pulling-out of a charger and generating, by the power management chip, a corresponding interrupt request may be: generating, by the power management chip, a second interrupt request when the power management chip detects pulling-out of the charger; and the controlling, by a baseband chip, a General Purpose Input/Output port GPIO to output a corresponding level according to the interrupt request may be:

controlling, by the baseband chip, the GPIO to output a low level to a USB-bus-power-supply positive terminal pin USB_VBUS according to the second interrupt request, wherein the low level is no less than 0V and no more than a starting voltage of a USB state machine.

In the method, the controlling, by the baseband chip, start of USB communication may be:

when detecting, by the baseband chip, that the level input to the pin USB_VBUS is less than the starting voltage of the USB state machine, terminating, by the baseband chip, the USB communication via the USB state machine, and shutting down, by the baseband chip, the USB state machine.

By connecting the port GPIO and the pin USB_VBUS and controlling an output level of GPIO with a software, a high level or a low level (as a triggering signal for starting or terminating the USB communication) is input to the pin USB_VBUS, thus avoiding damage to the device as well as triggering both the charging state machine and the USB state machine with the voltage threshold at pin VCHG.

DETAILED DESCRIPTION

According to various embodiments of the present disclosure, a port GPIO of a baseband chip of a device is connected to a pin USB_VBUS of a USB interface of the baseband chip; based on this circuit, a power management chip detects a state of plugging-in-or-pulling-out of a charger and generates a corresponding interrupt request, and the baseband chip controls the GPIO to output a corresponding level according to the interrupt request.

Figure 1:
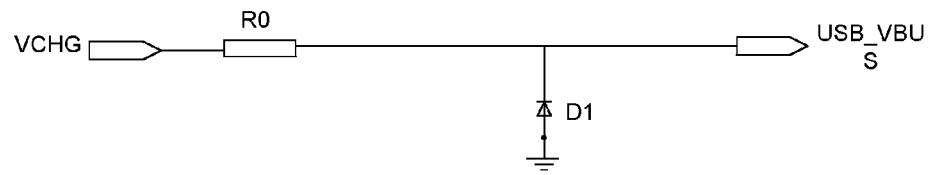
FIG. 1 shows a diagram of a structure of an electronic device having a USB interface in the related art.
Figure 2:
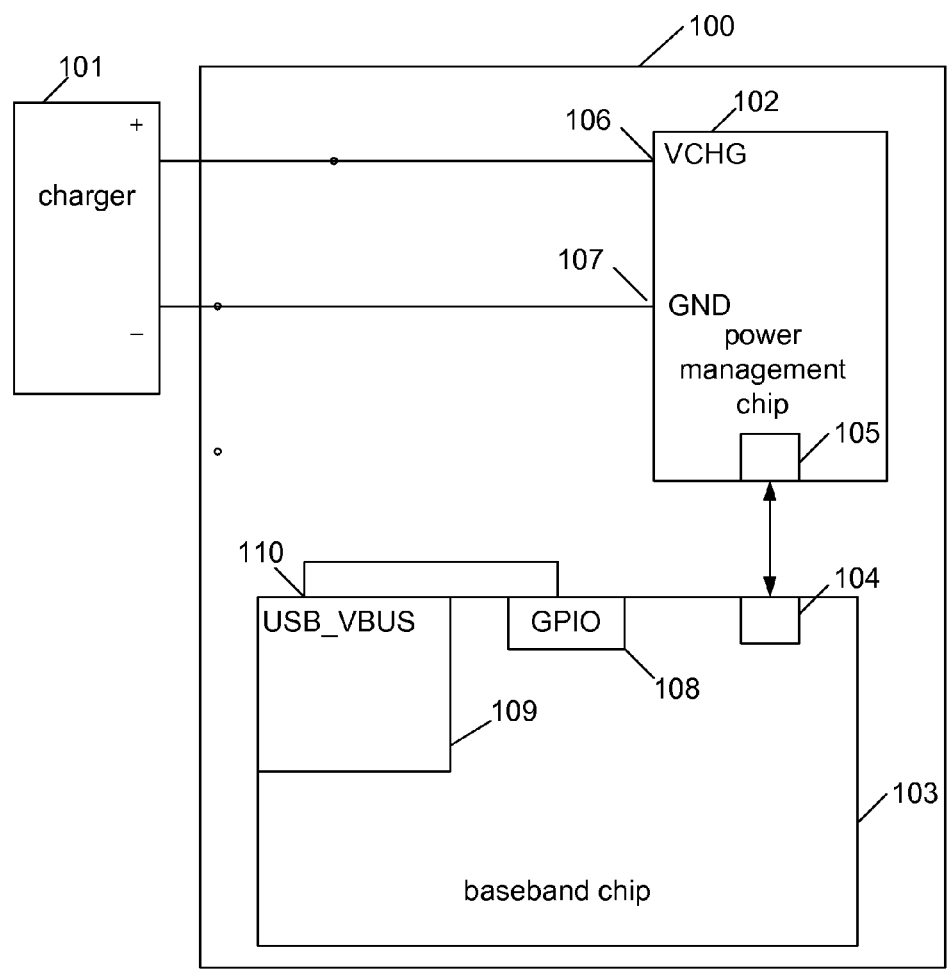
FIG. 2 shows a diagram of a structure of an electronic device having a USB interface provide by the present disclosure.

A preferred embodiment of the present disclosure is described below with reference to the drawings. A first embodiment of the present disclosure is an electronic device 100 having a USB interface. The principle of the device 100 is described with reference to FIG. 2. The device 100 includes a power management chip 102 and a baseband chip 103, wherein a communication interface 104 of the baseband chip 103 is connected to a communication interface 105 of the power management chip 102, the power management chip 102 includes a charging voltage pin VCHG 106 and a ground pin 107 connected respectively to a positive terminal and a negative terminal of an external charger 101; the baseband chip 103 includes a port GPIO 108 and a USB interface 109, with the General Purpose Input/Output port GPIO 108 being short-circuited with a USB-bus-power-supply positive terminal pin USB_VBUS 110 of the USB interface 109.

A preferred embodiment of the electronic device having a USB interface in the present embodiment is a handheld terminal having a USB interface, mainly due to wide use of the USB interface of the handheld terminal for both charging and USB communication.

In a specific implementation, for a handheld terminal in which a same interface socket is shared for both charging and USB, the communication interface of the baseband chip 103 can be a Serial Bus Interface (SBI), a Single-wire Serial Bus Interface (SSBI), an Inter Integrated Circuit Bus (I2C), or a Serial Peripheral Interface (SPI); the communication interface of the power management chip can be an SBI, an SSBI, an I2C or an SPI; the communication interface of the baseband chip is connected to the communication interface of the power management chip through an interface bus.

An embodiment of the present disclosure also provides a method for starting USB communication with the aforementioned electronic device having a USB interface.

Based on the aforementioned circuit, the pin USB_VBUS is connected to the GPIO of the baseband processor, which GPIO outputs a level independent of the VCHG; and then a USB state machine is started using a software of the handheld set according to the VCHG. The principle for starting the USB state machine by the VCHG is as follows.

The method relates to three pins in the internal circuit of the handheld terminal device, namely, a charging voltage pin VCHG, a pin USB_VBUS (the positive terminal of a USB bus power supply), and a pin GPIO. The pin VCHG is on the power management chip, while the pin USB_VBUS and the pin GPIO are on the baseband chip. The pin VCHG serves to detect the state of plugging-in-or-pulling-out of the charger. It is determined that the charger is plugged in when the voltage at pin VCHG is greater than a certain threshold (e.g. 3.3V), and it is determined that the charger is pulled out when the voltage at pin VCHG is less than or equal to a certain threshold (e.g. 3.3V). When a voltage at the USB power supply pin USB_VBUS (the positive terminal of a USB bus power supply) is greater than a session value (e.g. 2.0V) in a USB standard, it is determined that a USB communication cable is plugged in, and a USB state machine is thus started; and when the voltage at pin USB_VBUS is no less than 0V and no more than the session value (e.g. 2.0V) in the USB standard, it is determined that the USB communication cable is pulled-out. The pin GPIO is configured to output a high logic level between 2.0V and 5.25V (excluding 2.0V and 5.25V) or a low level between 0V and 2.5V (excluding 2.0V). The operating voltage of VCHG is in a range of relatively high voltages which is normally from more than 10V to 20V (up to 18V, for example). The operating voltage of USB_VBUS is in a lower voltage range (up to 5.25, for example).

According to a relevant standard, it is required that the charging cable and the USB communication cable share one interface and the charging is performed with protection from an overvoltage of about 8V-10V, that is, the handheld terminal will not be damaged when the output of the charger is 8V-10V.

Accordingly, a principle of the detailed implementation of the method of the embodiment of the present disclosure is described as follows. According to the circuit above, a power management chip 102 may detect a state of plugging-in-or-pulling-out of a charger 101, the power management chip 102 generates an interrupt request according to the detected result, the baseband chip 103 will receive the interrupt request generated by the power management chip 102 according to the detected result, and baseband chip 103 controls the port GPIO 108 to output a corresponding level according to the interrupt request.

As a voltage the USB_VBUS can withstand is lower than a threshold of overvoltage protection in charging, and pin USB_VBUS may be damaged during overvoltage charging, the pin USB_VBUS is connected to the pin GPIO which outputs a voltage of high logic level (no more than a voltage the USB_VBUS can withstand, that is, no more than the maximum operating voltage of the USB_VBUS), thus avoiding any damage to the device.

The spirit of an embodiment of the present disclosure is that the USB state machine is started by detecting the voltage at the VCHG in a software. When the voltage at pin VCHG is greater than 3.3V, the power management chip 102 in the terminal circuit determines that a charger is plugged in, and chip 102 generates an interrupt request at the same time to inform the baseband chip 103 (in which a software program of the handheld set runs) in the handheld set to control that a high level is output at GPIO and is provided to USB_VBUS to trigger start of USB communication; or when the voltage at pin VCHG is no greater than 3.3V, the software controls that a low level is output at the GPIO to trigger termination of USB communication.

The method for starting USB communication with the electronic device having a

Figure 3:
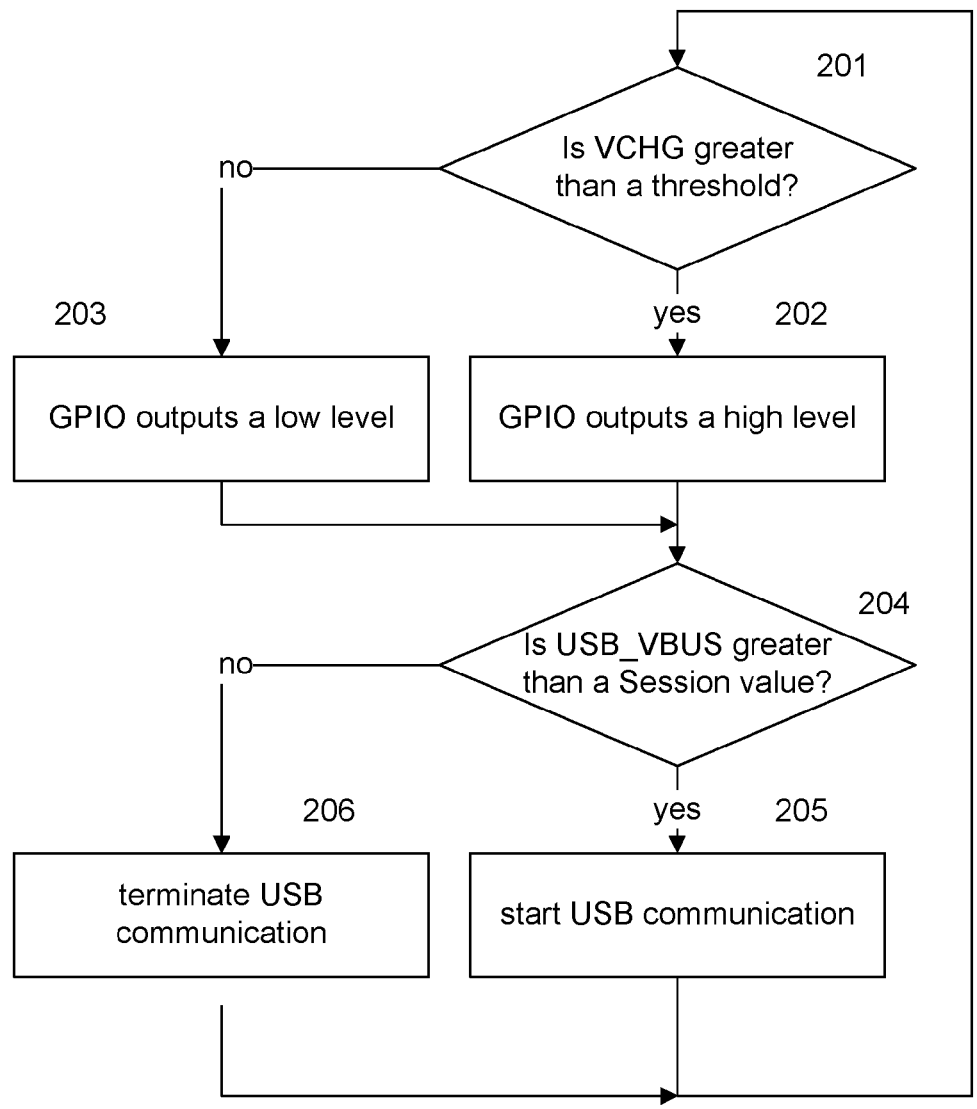
FIG. 3 shows a flow chart of a method provided by the present disclosure.

USB interface provided by the present disclosure will be described below in detail with reference to the FIG. 3. The method includes:

Step 201: a power management chip 102 detects whether a charger is plugged in; if a charger is plugged in, step 202 is executed; if no charger is plugged in, step 203 is executed.

The implementation of this step may be to detect if the voltage of VCHG is greater than a threshold of 3.3V.

Step 202: a baseband chip 103 sets a high level at GPIO according to a valid wall charger interrupt generated by the power management chip 102 (e.g. a high_level voltage range is from 2.0V to 5.25V, excluding 2.0V and 5.25V), then the flow continues by executing step 204.

Step 203: baseband chip 103 sets a low level at GPIO according to an invalid wall charger interrupt generated by the power management chip 102 (e.g. a low level voltage range is from 0V to 2.0V, excluding 2.0V), then the flow continues by executing step 204.

Step 204: baseband chip 103 determines whether USB_VBUS (i.e., the level output at GPIO) is greater than a USB session value 2.0V, and if USB_VBUS is greater than the session value, the flow continues by executing step 205, otherwise the flow continues by executing step 206.

Step 205: USB communication is started and then the flow returns to 201.

Step 206: USB communication is terminated, and then the flow returns to 201.

Wherein, in step 205, baseband chip 103 starts the USB state machine which then starts USB communication when baseband chip 103 detects that the level input to the pin USB_VBUS is 4V which is greater than the USB session threshold 2.0V.

Wherein, in step 206, baseband chip 103 terminates USB communication via the USB state machine which jumps from a normal state to a shutdown state when baseband chip 103 detects that the level input to the pin USB_VBUS is 1V which is less than the USB session threshold 2.0V.

Finally, note that the embodiments above are merely for explaining the technical solution of the present disclosure and are not intended to limit it; although the present disclosure is described in detail with reference to the preferred embodiments, those skilled in the art will understand that it is possible to make various modifications and equivalent replacements to the solution of the present disclosure without departing from the spirit and scope of the appended claims.

The invention claimed is:

1. An electronic device having a USB interface, the electronic device comprising a power management chip and a baseband chip, wherein a communication interface of the baseband chip is connected to a communication interface of the power management chip, the power management chip comprises a charging voltage pin VCHG configured for connection to a positive terminal of an external charger, and a General Purpose Input/Output port GPIO of the baseband chip is connected to a USB-bus-power-supply positive terminal pin USB_VBUS of a USB interface of the baseband chip, wherein the power management chip is configured for: detecting a state of pluqqinq-in-or-pullinq-out of the charger, generating an interrupt request corresponding to the state of plugging-in-or-pulling-out of the charger, and sending the interrupt request to the baseband chip; and the baseband chip is configured for: receiving the interrupt request sent by the power management chip, controlling a General Purpose Input/Output port GPIO to output a level corresponding to the interrupt request to the pin USB VBUS, and controlling start of USB communication according to the level output to the pin USB VBUS by the GPIO.

2. The electronic device having a USB interface according to claim 1, wherein the communication interface of the baseband chip is a Serial Bus Interface, a Single-wire Serial Bus Interface, an Inter Integrated Circuit Bus, or a Serial Peripheral Interface.

3. The electronic device having a USB interface according to claim 1, wherein the communication interface of the power management chip is a Serial Bus Interface, a Single-wire Serial Bus Interface, an Inter Integrated Circuit Bus, or a Serial Peripheral Interface.

4. The electronic device having a USB interface according to claim 1, wherein the communication interface of the baseband chip is connected to the communication interface of the power management chip through an interface bus.

5. The electronic device having a USB interface according to claim 1, wherein the electronic device having a USB interface is a handheld terminal having a USB interface.

6. A method for starting USB communication with an electronic device having a USB interface, the method comprising:

detecting, by a power management chip, a state of plugging-in-or-pulling-out of an external charger and generating, by the power management chip, an interrupt request corresponding to the state of plugging-in-or-pulling-out of the charger; and controlling, by a baseband chip, a Generate Purpose Input/Output port GPIO to output a level corresponding to the interrupt request to a USB-bus-power-supply positive terminal pin USB_VBUS, and controlling, by the baseband chip, start of USB communication according to the level output to the pin USB_VBUS by the GPIO, wherein the level includes a high level that is greater than a starting voltage of a USB state machine and less than a maximum operating voltage of the pin USB_VBUS.

7. The method according to claim 6,
wherein the detecting, by a power management chip, a state of plugging-in-or-pulling-out of an external charger and generating, by the power management chip, an interrupt request corresponding to the state of plugging-in-or-pulling-out of the charger is: generating, by the power management chip, a first interrupt request when the power management chip detects plugging-in of the charger; and
wherein the controlling, by a baseband chip, a General Purpose Input/Output port GPIO to output a level corresponding to the interrupt request is: controlling, by the baseband chip, the GPIO to output the high level to the pin USB_VBUS according to the first interrupt request.

8. The method according to claim 7, wherein the controlling, by the baseband chip, start of USB communication is:
when detecting, by the baseband chip, that the level input to the pin USB_VBUS is greater than the starting voltage of the USB state machine, starting, by the baseband chip, the USB state machine, and starting, by the USB state machine, the USB communication.

9. The method according to claim 6,
wherein the detecting, by a power management chip, a state of plugging-in-or-pulling-out of an external charger and generating, by the power management chip, an interrupt request corresponding to the state of plugging-in-or-pulling-out of the charger is: generating, by the power management chip, a second interrupt request when the power management chip detects pulling-out of the charger; and
wherein the controlling, by a baseband chip, a General Purpose Input/Output port GPIO to output a level corresponding to the interrupt request is: controlling, by the baseband chip, the GPIO to output a low level to the pin USB_VBUS according to the second interrupt request, wherein the low level is no less than 0V and no more than a starting voltage of a USB state machine.

10. The method according to claim 9, wherein, the controlling, by the baseband chip, start of USB communication is:
when detecting, by the baseband chip, that the level input to the pin USB_VBUS is less than the starting voltage of the USB state machine, terminating, by the baseband chip, the USB communication via the USB state machine, and shutting down, by the baseband chip, the USB state machine.

* * * * *